United States Patent
Kozlosk et al.

(10) Patent No.: US 9,148,281 B2
(45) Date of Patent: *Sep. 29, 2015

(54) RANDOM NUMBER GENERATION

(71) Applicant: International Business Machines Corporation, Armonk, NY (US)

(72) Inventors: James R. Kozlosk, New Fairfield, CT (US); Robert K. Montoye, Rocheter, MN (US); Raquel Norel, Bronx, NY (US); John J. Rice, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 275 days.

This patent is subject to a terminal disclaimer.

(21) Appl. No.: 13/786,411

(22) Filed: Mar. 5, 2013

(65) Prior Publication Data
US 2014/0258589 A1 Sep. 11, 2014

(51) Int. Cl.
*H04L 9/08* (2006.01)
*H04L 9/00* (2006.01)

(52) U.S. Cl.
CPC .............. *H04L 9/0869* (2013.01); *H04L 9/001* (2013.01); *H04L 2209/127* (2013.01)

(58) Field of Classification Search
None
See application file for complete search history.

(56) References Cited

U.S. PATENT DOCUMENTS

| 6,266,413 | B1 * | 7/2001 | Shefi .............................. 380/46 |
| 2005/0289646 | A1 | 12/2005 | Zimmer et al. |
| 2008/0016135 | A1 * | 1/2008 | Janke et al. .................. 708/251 |
| 2011/0007902 | A1 | 1/2011 | Brettle et al. |
| 2011/0035602 | A1 | 2/2011 | Meng et al. |
| 2012/0042157 | A1 | 2/2012 | Leclercq |
| 2014/0258594 | A1 * | 9/2014 | Kozlosk et al. ............... 711/103 |

FOREIGN PATENT DOCUMENTS

CN 102362280 2/2012

OTHER PUBLICATIONS

Xing Zhang, et al., "Implementation of ECC-Based Trusted Platform Module", 2007.

* cited by examiner

*Primary Examiner* — Denise Tran
(74) *Attorney, Agent, or Firm* — Ido Tuchman; Louis J. Percello

(57) ABSTRACT

A system for random number generation may include non-volatile memory, and a random number stored on the non-volatile memory. The system may also include a key linked to the random number. The system may further include a computer-apparatus designed to use the random number based upon the key.

11 Claims, 4 Drawing Sheets

RANDOM NUMBER GENERATION

BACKGROUND

The disclosure relates to the field of computer systems, and, more particularly, to computer systems using random numbers.

Digital computers can require large numbers of high quality, random numbers in many applications like security, game type simulations and diverse areas of computational modeling of biology, finance, and nuclear breakdown. However, random physical processes that could produce strings of random numbers are essentially incompatible with standard computers that are essentially deterministic, finite-state devices. As such, several options are used although all have serious limitations.

Pseudo-random number (PRN) generators are the most common approach to generate bases for chaotic systems of equations. The number calls to these random number generating functions can be very high and force a surprising large number of floating point operations (sometimes consuming near 100% of CPU time). However these pseudo-random approaches are deterministic and require seed numbers that may be hard to "randomly" produce, especially in large quantities (e.g., typical approaches based on calendar or clock times do not work in massively parallel machines with very large numbers of cores running parallel). In some cases, the seed can be reverse engineered so that pseudo-random becomes worthless for security or encryption applications. Interesting, the deterministic nature of the pseudo-random number generator have the ability to exactly reproduce a stochastic simulation—a feature that is favored by some computational researchers that may need debug a code or validate a particular result with the same "random" input.

Analogue random number (ARN) generators are based on noisy systems that are then used to generate random strings of bits. While ARN's potentially may generate more random numbers than PRN's, downsides include high power costs and difficulties in constructing and tuning analogue circuits on digital silicon chips. One company has recently patented circuit designs of the ARN type, while another company's 10 year research program recently switched from ARN circuits to digital approaches that have lower power consumption and few fabrication problems.

Many chaotic physical systems can be used to generate streams of high-quality random numbers, e.g., precomputed random numbers (PCRN). For example, random numbers can be generated from radioactive break down or even lava lamps, e.g., random number generator that worked by taking pictures of the patterns made by the floating material in lava lamps, extracting random data from the pictures, and using the result to seed a pseudo-random number generator. The main downside of these approaches is the limitation of producing large enough quantities of good random numbers and making them available for digital calculations.

SUMMARY

According to one embodiment, a system for random number generation may include non-volatile memory, and a set of pre-generated random numbers stored on the first non-volatile memory. The system may also include a key that uniquely identifies the set of random numbers. The system may further include a computer processor coupled to the non-volatile memory. The computer processor is configured to receive a random number from the set of pre-generated random numbers.

Another example aspect of the invention is a method for random number generation. The method may include storing a set of pre-generated random numbers on a non-volatile memory. The method may also include associating a key to the set of pre-generated random numbers. The key uniquely identifies the set of random numbers. The method may further include receiving a random number from the first set of pre-generated random numbers by a computer processor coupled to the non-volatile memory.

Another example aspect of the invention is computer readable program codes coupled to tangible media to provide random numbers. The computer readable program codes may be configured to cause the program to store a set of pre-generated random numbers on a non-volatile memory. The computer readable program codes may be configured to cause the program to associate a key to the set of pre-generated random numbers and that uniquely identifies the set of random numbers. The computer readable program codes may be configured to cause the program to receive a random number from the first set of pre-generated random numbers by a computer processor coupled to the non-volatile memory.

DETAILED DESCRIPTION

Embodiments will now be described more fully hereinafter with reference to the accompanying drawings, in which preferred embodiments are shown. Like numbers refer to like elements throughout.

Figure 1:
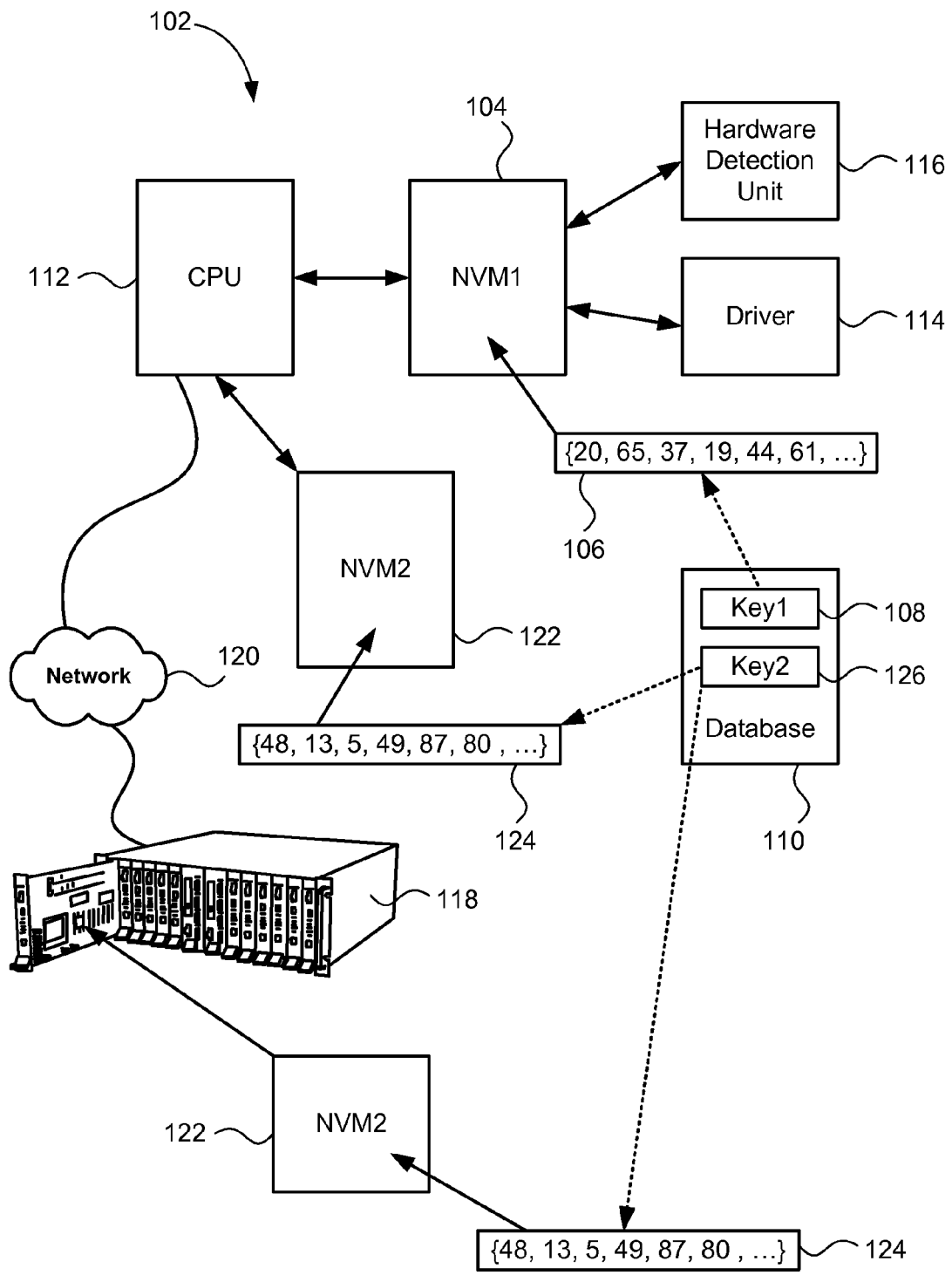
FIG. 1 is a block diagram illustrating a random number system in accordance with various embodiments.

With reference now to FIG. 1, an example system 102 for random number generation contemplated by the present invention is shown.

The system 102 includes a first non-volatile memory 104 with a first set of pre-generated random numbers 106 stored on the first non-volatile memory 104. In one embodiment, the first set of pre-generated random numbers 106 is stored on the first non-volatile memory 104 during the manufacture of the first non-volatile memory 104.

A first key 108 uniquely identifies the first set of random numbers 106. In one embodiment of the invention, a database 110 associates the first key 108 with the first set of pre-generated random numbers 106.

The system 102 further includes a computer processor 112 coupled to the first non-volatile memory 104. The computer processor 112 is configured to receive a random number from the first set of pre-generated random numbers 106. In one embodiment, a driver 114 is invoked when the random number is requested by the computer processor 112. The driver 114 is configured to initialize the first non-volatile memory 104 from a low power state to a high power state. For example, the lower power state consumes less power than the high power state.

The system 102 may be configured such that the computer processor receives a random number from the first set of pre-generated random numbers 106 when the computer processor is supplied with the first key 108. For example, the first key 108 may be supplied to the computer processor 112 as seed in a random number generator function. This seed allows a user to rerun the same computation with the same set of pseudorandom numbers. Providing the first key 108 as a seed signals to the system to supply a random number from the first non-volatile memory 104 if the provided seed matches the first key 108. If the seed is not the first key 108, the random number may be algorithmically generated.

The system 102 may include a hardware detection unit 116. The hardware detection unit 116 detects when the computer processor 112 is coupled to the first non-volatile memory 104. When the computer processor 112 is coupled to the first non-volatile memory 104, computer processor 112 is configured to receive the random number from the first non-volatile memory 104. On the other hand, when the computer processor 112 is not coupled to the first non-volatile memory 104, the computer processor is configured to calculate the random number or pseudo-random number based on software or hardware that executes on the processor itself.

In one embodiment, the system 102 may include a plurality of computer nodes 118 coupled to the computer processor 112 over a network 120. A second non-volatile memory 122 includes a second set of pre-generated random numbers 124. The second set of pre-generated random numbers 122 are correlated across the plurality of computer nodes 118. Additionally, the first set of pre-generated random numbers 106 are not correlated across the plurality of computer nodes 118. In one embodiment, a second key 126 uniquely identifies the second set of random numbers 124.

Figure 2:
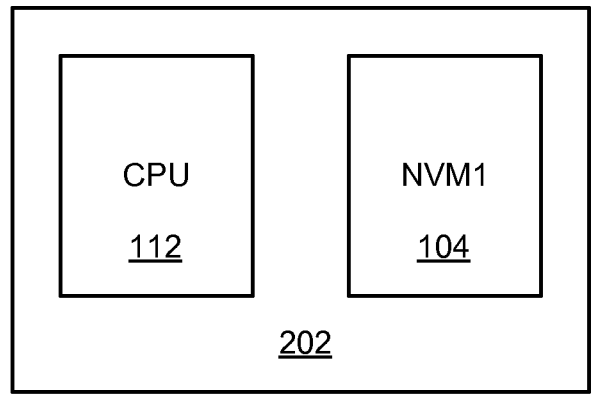
FIG. 2 shows one embodiment of the present invention where the non-volatile memory is located on the same die as the computer processor.

FIG. 2 shows one embodiment of the present invention where the non-volatile memory 104 is located on the same die 202 as the computer processor 112.

Figure 3:
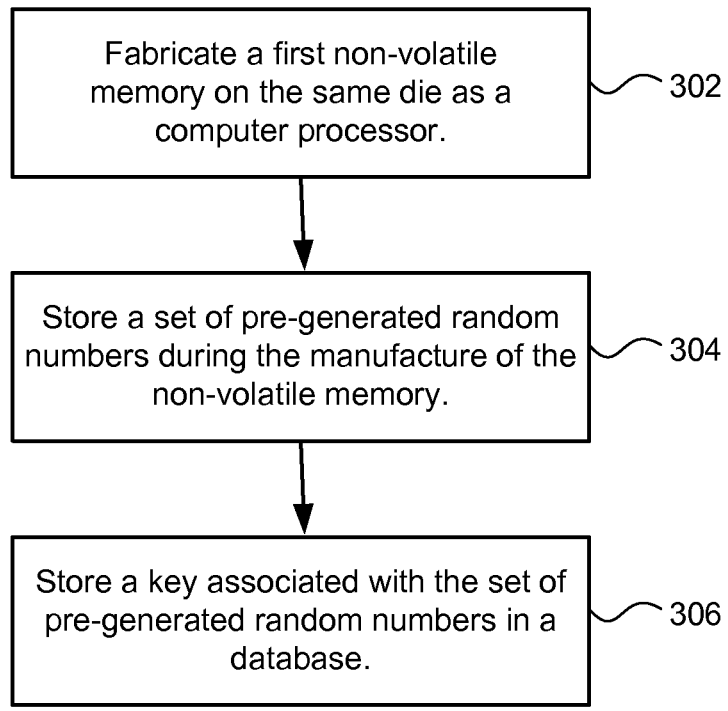
FIG. 3 shows an example process for random number generation contemplated by the present invention.

FIG. 3 shows an example process for random number generation contemplated by the present invention. The process includes a fabricating step 302 for fabricating the first non-volatile memory on the same die as the computer processor. Next, at storing step 304, a set of pre-generated random numbers is stored during the manufacture of the non-volatile memory. The process may further include storing step 306. During storing step 306, a key associated with the set of pre-generated random numbers is stored in a database.

Figure 4:
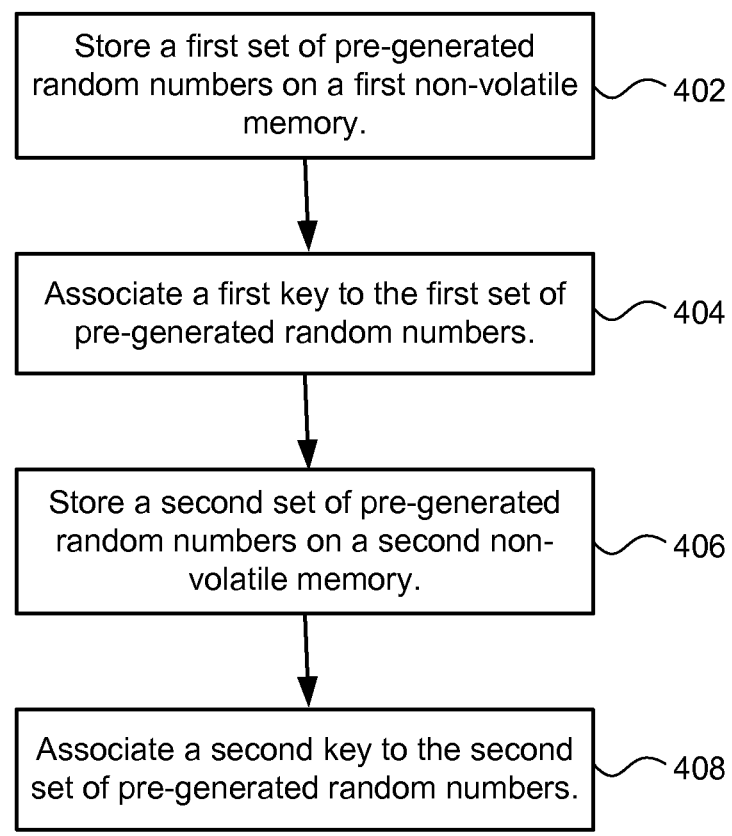
FIG. 4 shows another example process for random number generation contemplated by the present invention.

FIG. 4 shows another example process for random number generation contemplated by the present invention. The process includes storing step 402. During this step, a first set of pre-generated random numbers on a first non-volatile memory. After storing step 402 is completed, the process continues to associating step 404.

At associating step 404, a first key is associated to the first set of pre-generated random numbers. The first key uniquely identifies the first set of random numbers. After associating step 404 is completed, the process continues to storing step 406.

At storing step 406, a second set of pre-generated random numbers is stored on a second non-volatile memory. In one embodiment, the second set of pre-generated random numbers are correlated across a plurality of computer nodes and the first set of pre-generated random numbers are not correlated across the plurality of computer nodes. After storing step 406 is completed, the process continues to associating step 408.

At associating step 408 a second key is associated to the second set of pre-generated random numbers. The second key uniquely identifies the second set of random numbers. In one embodiment, the first key and the second key are stored in a database.

Figure 5:
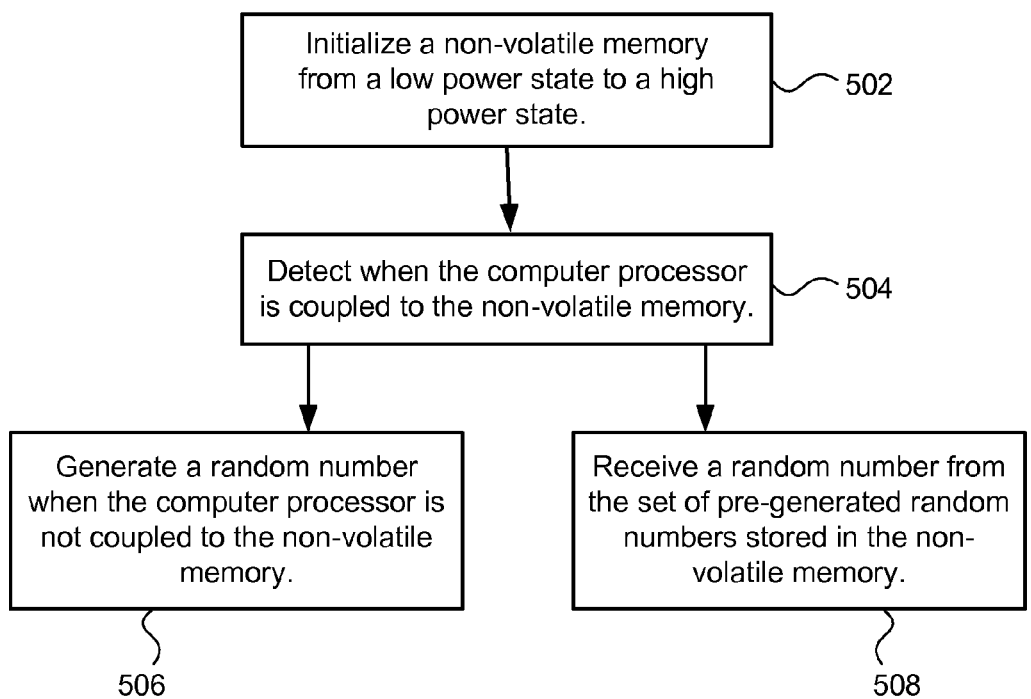
FIG. 5 shows another example process for random number generation contemplated by the present invention.

FIG. 5 shows another example process for random number generation contemplated by the present invention. The process may include initializing step 502. During initializing step 502, a non-volatile memory is initialized from a low power state to a high power state when the random number is requested from a computer processor. The lower power state consumes less power than the high power state. After initializing step 502 is completed, the process continues to detecting step 504.

At detecting step 504, a hardware detecting unit detects when the computer processor is coupled to the non-volatile memory. If the processor is not coupled to the non-volatile memory, process flow proceeds to calculating step 506, where a random number is calculated by the computer processor. If the processor is coupled to the non-volatile memory, process flow proceeds to receiving step 508, where a random number is received from the set of pre-generated random numbers by the computer processor.

In view of the foregoing, the system 102 provides random numbers at greater speed, with better reproducibility, and/or the like. For example, the embodiments make use of prefabricated non-volatile memory 104 (NVM) to store a large array of random numbers. The NVM 104 is then used to provide a random number whenever one is required by a code in order for code execution to proceed.

In one embodiment, a sequence of random numbers are generated by either the manufacturer or test process for introducing random bits patterns in NVM 104 or by pre-computing them then storing a random number sequence in NVM. In another embodiment, the NVM 104 is packaged in a NVM device and associated with a key that uniquely identifies the random number sequence stored in it (such as by using a unique identifier as a key. Multiple NVM 104 packages may contain the same random number sequence and share the same key.

In one embodiment, the hardware detects the presence of the device and executes a hardware-driver 114 based action to initialize the system 102 in a particular state. In another embodiment, the initialized system 102 now executes certain codes and not others whenever a random number generating function or code is executed. In the absence of the device, the system state permits typical algorithm random number generation to proceed on the CPU.

In one embodiment, the code is executed repeatedly from within a piece of software, each time accessing the next random number in the storage device or generating a different random number based on the random sequence inside the storage device.

In one embodiment, the system 102 uses a manufacturing or test process to store random numbers in an NVM 104. In another embodiment, the system 102 associates a unique identifier with a particular manufactured random number containing NVM 104.

In one embodiment, the system 102 uses hardware detection of the device and execution of a hardware-driver 114 that causes the system to execute certain codes and not others whenever a random number generating function or code is executed. In another embodiment, the system 102 uses two devices on a parallel architecture, one for local random number generation, and the other for globally consistent generation.

As a result, the system 102 provides a method and system for exploiting a solid state storage device (i.e., a non-volatile memory 104) to increase the speed of generating large arrays of random numbers in a computing system. In one embodiment, the method includes pre-loading a non-volatile memory 104 with random numbers and providing hardware control of specific random number generating function calls within code libraries to allow access of the solid-state random number generating method or standard CPU-based methods without specific additional coding requirement.

In contrast, the main downside of prior approaches is in the limitation of producing large enough quantities of good random number and making them available for digital calculations. That is, a string of pre-computed random numbers could be streamed into a single CPU from disk or some other source, but the same approach becomes impractical in a massively parallel machine with thousand or million cores running in parallel. Hence, the existing methods to generate and stream appear to be incompatible with massively parallel computers using existing disk and communication technologies.

In one embodiment, the system 102 uses prefabricated non-volatile memory (NVM) 104 to store a large array of random numbers. This storage device 104 is then used to provide a random number whenever one is required by a code in order for code execution to proceed. In another embodiment, the system 102 provides large quantities of very random strings of 1's and 0's, low latencies and high throughput, low power consumption, low cost to manufacture, reproducibility if desired, and/or transparency to the user.

In one embodiment, the large quantities of random strings of 1's and 0's on the NVM 104 can contain many gigabytes of random bits. Moreover, the data can be accessed bit-wise into which offsets are more complicated than simple sequentially patterns. For example, sequentially accessed offsets could be incremented using pseudo-random sequences or random numbers retrieved from the same or another NVM that would allow for extremely long repeat periods. In another embodiment, the NVM 104 could also be swapped in and out to insure that the two random dataset are completely uncorrelated (i.e., the data one NVM will have no correlation with another).

In one embodiment, the low latencies and high bandwidth are provided by the close proximity of the NVM 104 to the computational cores of the CPU 112, which will allow for short latencies and very fast access rates. In another embodiment, data can be streamed as a large block from NVM 104 to cache to give high overall throughput.

In one embodiment, the system 102 provides low power consumption because the NVM 104 can be accessed at a lower power cost than the standard PRN algorithmic methods (such as, for example, the Mersenne Twister). In another embodiment, the whole chip (the first non-volatile memory 104) can be depowered when random numbers are not required for the computation since, as discussed above, a driver 114 may be configured to initialize the first non-volatile memory 104 from a low power state to a high power state only when a random number is required from the first non-volatile memory 104.

In one embodiment, the system 102 provides a low cost to manufacture as the manufacture of the NVM 14 is accomplished to "print" random bit via a procedure that could be based on highly random processes (e.g. quantum release of photons). The individual chip could be tested and certified at low cost and the chip's dataset could be stored if desired). The potential is also there to produce duplicates if required for a given application (e.g., such as in a transmitter and receiver pair with same random number stored on matching pair of FLASH chips).

In another embodiment, the system 102 provides reproducibility if desired. For instance, the random set of 1's and 0's could be accessed in deterministic way that would allow reproducibility of the string of random number is desired.

In one embodiment, the system 102 provides transparency to the user. For example, accessing of random numbers in the NVM 104 storage device may be by means of a standard interface, such as a function call or through a code object. Furthermore, these functions and code objects may be identical to those used to generate random numbers using standard algorithmic methods (such as, for example, the Mersenne Twister). By hiding the function behind this interface, the system 102 removes the need to write special purpose code for accelerated random number generation using solid state memory stores of pre-generated numbers. In this way, whenever the special storage device, e.g., NVM 104, containing random numbers is present, the system 102 can execute code associated with accessing random numbers sequentially from the storage device. When NVM 104 is not present, the system 102 can execute code that instead generates the random number algorithmically using standard CPU-based methods or hardware-based methods.

In one embodiment, the sequence of random numbers is generated either by some manufacturing or test process for introducing random bit patterns in NVM 104, or by pre-computing them then storing a random number sequence in NVM. In another embodiment, the NVM 104 is packaged in a NVM device and associated with a key that uniquely identifies the random number sequence stored in it (such as by using a unique identifier as a key). Note that multiple NVM 104 packages may contain the same random number sequence, and will therefore share the same key.

In one embodiment, the NVM 104 is connected to a hardware system 102 designed to receive it. In another embodiment, the NVM 104 is selected from a collection of such computer-apparatus, much as one selects a seed for random number generation in a standard software-based approach.

In one embodiment, the system 102 detects the presence of the NVM 104 and executes a hardware-driver 114 based action to initialize the system in a particular state. In another embodiment, the initialized system 102 now executes certain codes and not others whenever a random number generating function or code object is executed. In the absence of the NVM 104, the system 102 state permits typical algorithmic random number generation to proceed on the CPU.

In one embodiment, the code is executed repeatedly from within a piece of software, each time accessing the next random number in the NVM 104 or computing a different random number based on the random sequence inside the NVM.

In one embodiment, the test process provides a function to validate the hardware after manufacturing, but also provides a residual set of bits in the NVM 104 which are used subsequently. In another embodiment, the system 102 includes providing a non-volatile memory (NVM) 104 and CPU 112 comprising software and an access method either programmatic or direct (i.e., able to perform a calculation within the NVM, or measure a value itself). The NVM 104 in this case can be manipulated physically within the overall system 102 in order to place it or some portion of its components into a state with which the programmatic or direct method interacts.

As will be appreciated by one skilled in the art, aspects may be embodied as a system, method, and/or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described above with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "generation" in the context of random number generation refers to any algorithm, device-based method, retrieval from storage, or combination of the above, that produces a random or deterministic but random appearing number to be received by a computing system.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the various embodiments with various modifications as are suited to the particular use contemplated.

While the preferred embodiment has been described, it will be understood that those skilled in the art, both now and in the future, may make various improvements and enhancements which fall within the scope of the claims which follow. These claims should be construed to maintain the proper protection for the embodiments first described.

What is claimed is:

1. A system for random number generation comprising:
a first non-volatile memory;
a first set of pre-generated random numbers stored on the first non-volatile memory;
a first key that uniquely identifies the first set of random numbers; and
a computer processor coupled to the first non-volatile memory and configured to receive a random number from the first set of pre-generated random numbers;
a hardware detection unit to detect when the computer processor is coupled to the first non-volatile memory; and
wherein the computer processor is configured to receive the random number from the first non-volatile memory when the computer processor is coupled to the first non-volatile memory, and the computer processor is configured to generate the random number when the computer processor is not coupled to the first non-volatile memory.

2. The system of claim 1, wherein the first set of pre-generated random numbers is stored on the first non-volatile memory during the manufacture of the first non-volatile memory.

3. The system of claim 1, wherein the first non-volatile memory is located on the same die as the computer processor.

4. The system of claim 1, further comprising a database associating the first key with the first set of pre-generated random numbers.

5. The system of claim 4, further comprising a driver invoked when the random number is requested, the driver configured to initialize the first non-volatile memory from a low power state to a high power state, the lower power state consuming less power than the high power state.

6. The system of claim 1, further comprising:
a plurality of computer nodes coupled to the computer processor over a network; and
a second non-volatile memory including a second set of pre-generated random numbers;
wherein the second set of pre-generated random numbers are correlated across the plurality of computer nodes; and
wherein the first set of pre-generated random numbers are not correlated across the plurality of computer nodes.

7. The system of claim 6, further comprising a second key that uniquely identifies the second set of random numbers.

8. A computer program product for random number generation, the computer program product comprising:
a non-transitory computer readable storage medium having computer readable program code embodied therewith, the non-transitory computer readable program code configured to:
store a first set of pre-generated random numbers on a first non-volatile memory;
associate a first key to the first set of pre-generated random numbers, the first key uniquely identifies the first set of random numbers; and
receive a random number from the first set of pre-generated random numbers by a computer processor coupled to the first non-volatile memory;
detect when the computer processor is coupled to the first non-volatile memory;
calculate the random number when the computer processor is not coupled to the first non-volatile memory; and
wherein the computer readable program code to receive the random number from the first non-volatile memory is performed when the computer processor is coupled to the first non-volatile memory.

9. The computer program product of claim 8, further comprising program code configured to store the first key in a database, the database associating the first key with the first set of pre-generated random numbers.

10. The computer program product of claim 8, further comprising program code configured to initialize the first non-volatile memory from a low power state to a high power state when the random number is requested, the lower power state consuming less power than the high power state.

11. The computer program product of claim 8, further comprising program code to storing a second set of pre-generated random numbers on a second non-volatile memory, wherein the second set of pre-generated random numbers are correlated across a plurality of computer nodes, and wherein the first set of pre-generated random numbers are not correlated across the plurality of computer nodes.

* * * * *